United States Patent
Kim et al.

(10) Patent No.: US 12,400,797 B2
(45) Date of Patent: Aug. 26, 2025

(54) LOW PARASITIC EQUIVALENT SERIES L-INDUCTANCE (ESL) SYMMETRIC DIRECT CURRENT (DC) LINK CAPACITOR

(71) Applicant: GM GLOBAL TECHNOLOGY OPERATIONS LLC, Detroit, MI (US)

(72) Inventors: Junghoon Kim, Ann Arbor, MI (US); Muhammad Hussain Alvi, Troy, MI (US); Rashmi Prasad, Troy, MI (US); Chandra S. Namuduri, Troy, MI (US); Yilun Luo, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 18/308,201

(22) Filed: Apr. 27, 2023

(65) Prior Publication Data

US 2024/0363288 A1    Oct. 31, 2024

(51) Int. Cl.
*H01G 4/30* (2006.01)
*B60L 50/60* (2019.01)
*H01G 4/228* (2006.01)

(52) U.S. Cl.
CPC ............. *H01G 4/30* (2013.01); *B60L 50/60* (2019.02); *H01G 4/228* (2013.01); *B60L 2210/10* (2013.01); *B60L 2210/40* (2013.01)

(58) Field of Classification Search
None
See application file for complete search history.

(56) References Cited

U.S. PATENT DOCUMENTS

| | | | | |
|---|---|---|---|---|
| 8,559,161 B2* | 10/2013 | Takeoka | ............... | H01G 4/015 |
| | | | | 361/321.1 |
| 10,388,460 B2* | 8/2019 | Lei | .......... | B60L 3/0046 |
| 10,457,807 B2* | 10/2019 | Okamura | ............ | H01G 4/228 |
| 10,490,357 B2* | 11/2019 | Yamazaki | ............ | H02M 7/5387 |
| 11,232,906 B2* | 1/2022 | Nakao | .................... | H01G 4/005 |
| 11,335,504 B2* | 5/2022 | Nakao | .................... | H02P 27/06 |
| 11,631,545 B2* | 4/2023 | Kikuchi | ............... | H01G 4/385 |
| | | | | 318/139 |
| 11,854,747 B2* | 12/2023 | Nakao | ..................... | H01G 4/38 |
| 11,935,697 B2* | 3/2024 | Nishimura | ............. | H01G 2/103 |
| 12,224,129 B2* | 2/2025 | Imagawa | ............... | H02P 27/06 |

(Continued)

FOREIGN PATENT DOCUMENTS

| | | | | |
|---|---|---|---|---|
| AU | 2014280592 A1 * | 12/2015 | ............ | B60K 6/28 |
| DE | 102013216941 B4 * | 6/2016 | ............ | H01G 2/08 |

(Continued)

*Primary Examiner* — Dion R. Ferguson
(74) *Attorney, Agent, or Firm* — CANTOR COLBURN LLP

(57) ABSTRACT

Aspects of the disclosure include a symmetric direct current (DC) link capacitor having a low parasitic equivalent series L-inductance (ESL). An exemplary capacitor can include one or more positive-dielectric-negative (PDN) stacks having a positive layer, a negative layer, and a dielectric layer between the positive layer and the negative layer. A first contact layer is electrically coupled to the positive layer on a sidewall of the one or more PDN stacks and a second contact layer is electrically coupled to the negative layer on the sidewall of the one or more PDN stacks. A positive terminal is electrically coupled to the first contact layer and a negative terminal is electrically coupled to the second contact layer.

20 Claims, 7 Drawing Sheets

(56) References Cited

U.S. PATENT DOCUMENTS

| | | | | |
|---|---|---|---|---|
| 2003/0117763 A1* | 6/2003 | Connolly | ............... | H01G 4/232 |
| | | | | 361/301.5 |
| 2012/0218679 A1* | 8/2012 | Takeoka | ................ | H01G 4/012 |
| | | | | 361/311 |
| 2016/0049258 A1* | 2/2016 | Kojima | ................... | H01G 4/008 |
| | | | | 29/25.42 |
| 2017/0301463 A1* | 10/2017 | Boe | ........................... | H01G 4/38 |
| 2017/0338041 A1* | 11/2017 | Lei | ........................... | B60L 3/003 |
| 2018/0148574 A1* | 5/2018 | Okamura | ................. | H01G 4/18 |
| 2018/0269002 A1* | 9/2018 | Yamazaki | ............... | B60L 50/51 |
| 2021/0043384 A1* | 2/2021 | Nakao | ...................... | H01G 4/32 |
| 2021/0110973 A1* | 4/2021 | Kessler | ................... | H01G 2/04 |
| 2021/0193393 A1* | 6/2021 | Kikuchi | ................. | H01G 4/015 |
| 2021/0217558 A1* | 7/2021 | Nakao | ...................... | H01G 4/30 |
| 2021/0313112 A1* | 10/2021 | Nishimura | ............. | H01G 4/232 |
| 2022/0148810 A1* | 5/2022 | Nakao | ...................... | H01G 4/38 |
| 2022/0375690 A1* | 11/2022 | Kikuchi | .................. | H01G 4/33 |
| 2023/0051327 A1* | 2/2023 | Etou | ........................ | H01G 4/38 |
| 2023/0106645 A1* | 4/2023 | Tachibana | ............... | B60L 58/12 |
| | | | | 320/109 |
| 2023/0274888 A1* | 8/2023 | Imagawa | ................ | H02P 27/06 |
| | | | | 307/10.1 |
| 2024/0062964 A1* | 2/2024 | Hattori | .................... | B32B 18/00 |
| 2024/0096555 A1* | 3/2024 | Han | ........................ | H01G 4/232 |
| 2024/0363288 A1* | 10/2024 | Kim | .......................... | H01G 4/40 |

FOREIGN PATENT DOCUMENTS

| | | | | | |
|---|---|---|---|---|---|
| EP | 3230994 B1 | * | 6/2023 | ............ | H01G 2/065 |
| ID | P202303273 A | * | 4/2023 | | |
| JP | 2021030745 A | * | 3/2021 | ............ | B60K 6/365 |
| WO | WO-2022044725 A1 | * | 3/2022 | | |
| WO | WO-2022091710 A1 | * | 5/2022 | | |
| WO | WO-2022113738 A1 | * | 6/2022 | | |
| WO | WO-2022138105 A1 | * | 6/2022 | ............... | H01G 2/10 |
| WO | WO-2022202194 A1 | * | 9/2022 | | |

* cited by examiner

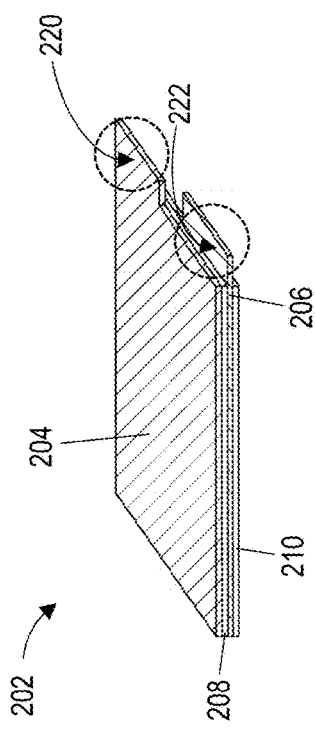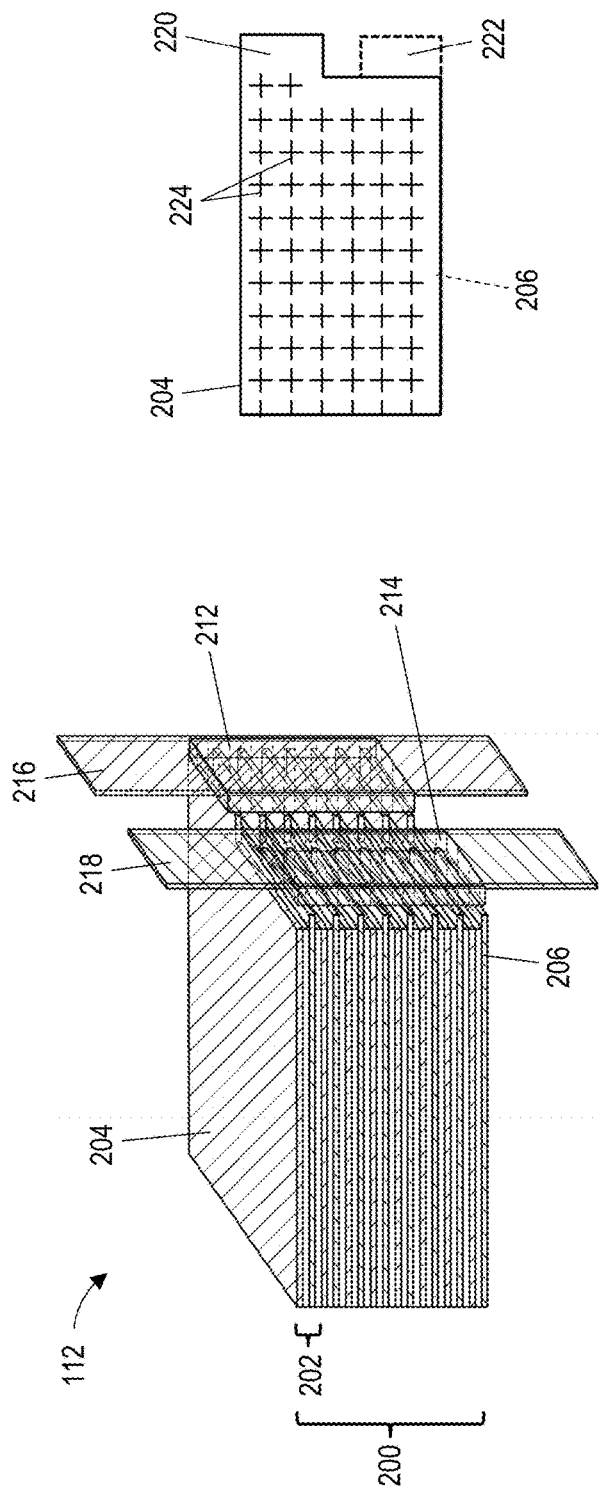

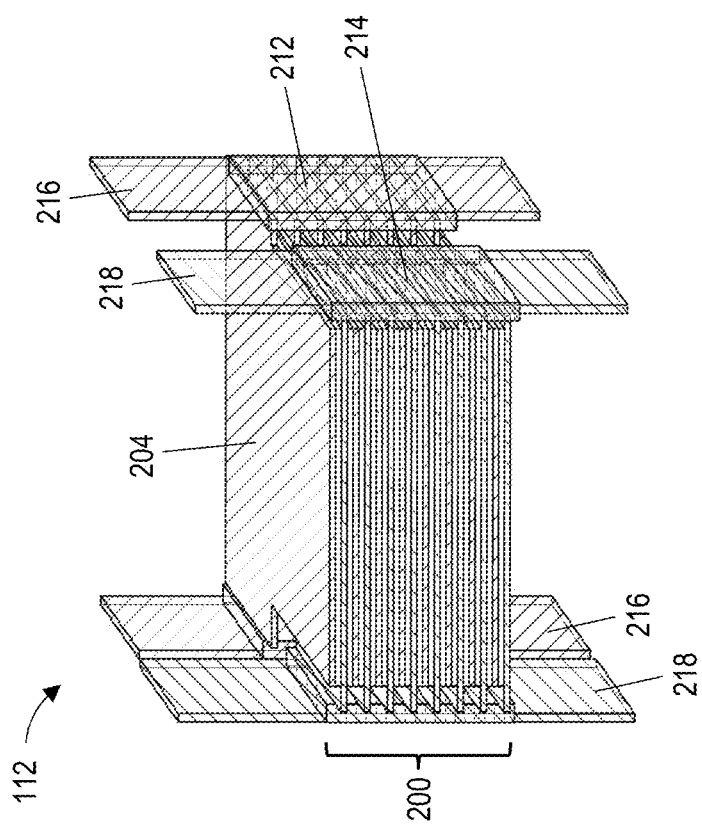
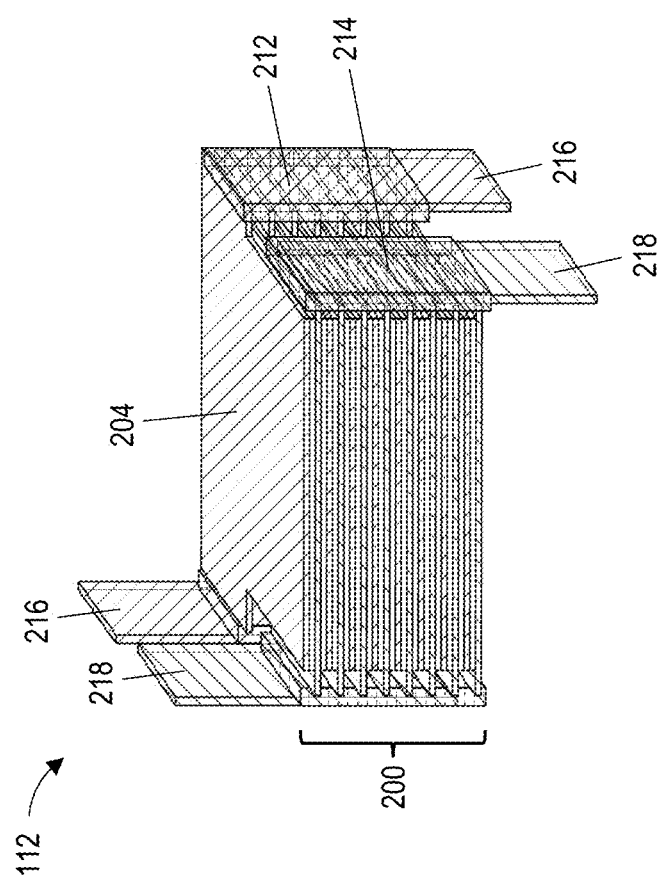
FIG. 4A
FIG. 4B

LOW PARASITIC EQUIVALENT SERIES L-INDUCTANCE (ESL) SYMMETRIC DIRECT CURRENT (DC) LINK CAPACITOR

INTRODUCTION

The subject disclosure relates to electrical energy storage and capacitors, and particularly to a low parasitic equivalent series L-inductance (ESL) symmetric direct current (DC) link capacitor.

High voltage electrical systems are increasingly used to power the onboard functions of both mobile and stationary systems. For example, in motor vehicles, the demand to reduce emissions has led to the development of advanced electric vehicles (EVs). EVs rely upon Rechargeable Energy Storage Systems (RESS), which typically include one or more high voltage battery packs, and an electric drivetrain (e.g., an electric motor) to deliver power from the battery to the wheels. The converter in an EV is responsible for converting the high-voltage DC power from the battery pack to the low-voltage DC power that is required by the vehicle's electrical system, while an inverter converts the DC power to AC power that is used to drive the electric motor.

Capacitors can be used in both the converter and inverter circuits to help filter out any high-frequency noise or ripple that may be present in the power signal. Capacitors can store charge and discharge it quickly, which makes them well-suited to smoothing out sudden voltage fluctuations. In addition, capacitors play a role in the switching mechanism of the converter and inverter. When a converter or inverter switches between different voltage levels, a brief period of voltage instability can occur, and capacitors can maintain a constant voltage level during this period allowing the converter or inverter to switch rapidly and efficiently between different voltage levels.

SUMMARY

In one exemplary embodiment a vehicle includes an electric motor, a battery pack electrically coupled to the electric motor, a converter configured to convert a direct current at a first voltage from the battery pack to a direct current at a second voltage lower than the first voltage, an inverter configured to convert the direct current from the battery pack to an alternating current supplied to the electric motor, and a capacitor electrically coupled to at least one of the inverter and the converter of the vehicle. The capacitor can include one or more capacitor modules, each including one or more positive-dielectric-negative (PDN) stacks having a positive layer, a negative layer, and a dielectric layer between the positive layer and the negative layer. The capacitor can further include a first contact layer electrically coupled to the positive layer on a sidewall of the one or more PDN stacks and a second contact layer electrically coupled to the negative layer on the sidewall of the one or more PDN stacks. A positive terminal is electrically coupled to the first contact layer and a negative terminal is electrically coupled to the second contact layer.

In addition to one or more of the features described herein, in some embodiments, each of the PDN stacks includes a bottom dielectric layer. The negative layer is between the dielectric layer and the bottom dielectric layer.

In some embodiments, the positive layer and the negative layer each include one of a single-sided metalized film and a double-sided metalized film.

In some embodiments, the positive terminal and the negative terminal collectively define a busbar of the capacitor. In some embodiments, the positive terminal and the negative terminal are positioned vertically and in parallel on a same sidewall of the PDN stacks as the first contact layer and the second contact layer.

In some embodiments, the positive layer includes a first protruding portion providing contact to the first contact layer and the negative layer includes a second protruding portion providing contact to the second contact layer. In some embodiments, the first protruding portion and the second protruding portion are offset with respect to one another such that the first protruding portion and the second protruding portion do not overlap.

In another exemplary embodiment a capacitor can include one or more PDN stacks having a positive layer, a negative layer, and a dielectric layer between the positive layer and the negative layer. A first contact layer is electrically coupled to the positive layer on a sidewall of the one or more PDN stacks and a second contact layer is electrically coupled to the negative layer on the sidewall of the one or more PDN stacks. A positive terminal is electrically coupled to the first contact layer and a negative terminal is electrically coupled to the second contact layer.

In yet another exemplary embodiment a method for reducing a parasitic equivalent series L-inductance of a capacitor can include forming one or more PDN stacks, each having a positive layer, a negative layer, and a dielectric layer between the positive layer and the negative layer. A first contact layer is electrically coupled to the positive layer on a sidewall of the one or more PDN stacks. A second contact layer is electrically coupled to the negative layer on the sidewall of the one or more PDN stacks. A positive terminal is electrically coupled to the first contact layer and a negative terminal is electrically coupled to the second contact layer.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 2A is a view of a capacitor in accordance with one or more embodiments;

FIG. 2B is a view of a single positive-dielectric-negative (PDN) stack of the capacitor of FIG. 2A in accordance with one or more embodiments;

FIG. 2C is a top-down view of the single PDN stack of FIG. 2B in accordance with one or more embodiments;

FIG. 4A is a view of another alternative embodiment of a capacitor in accordance with one or more embodiments;

FIG. 4B is a view of yet another alternative embodiment of a capacitor in accordance with one or more embodiments;

DETAILED DESCRIPTION

Figure 1:
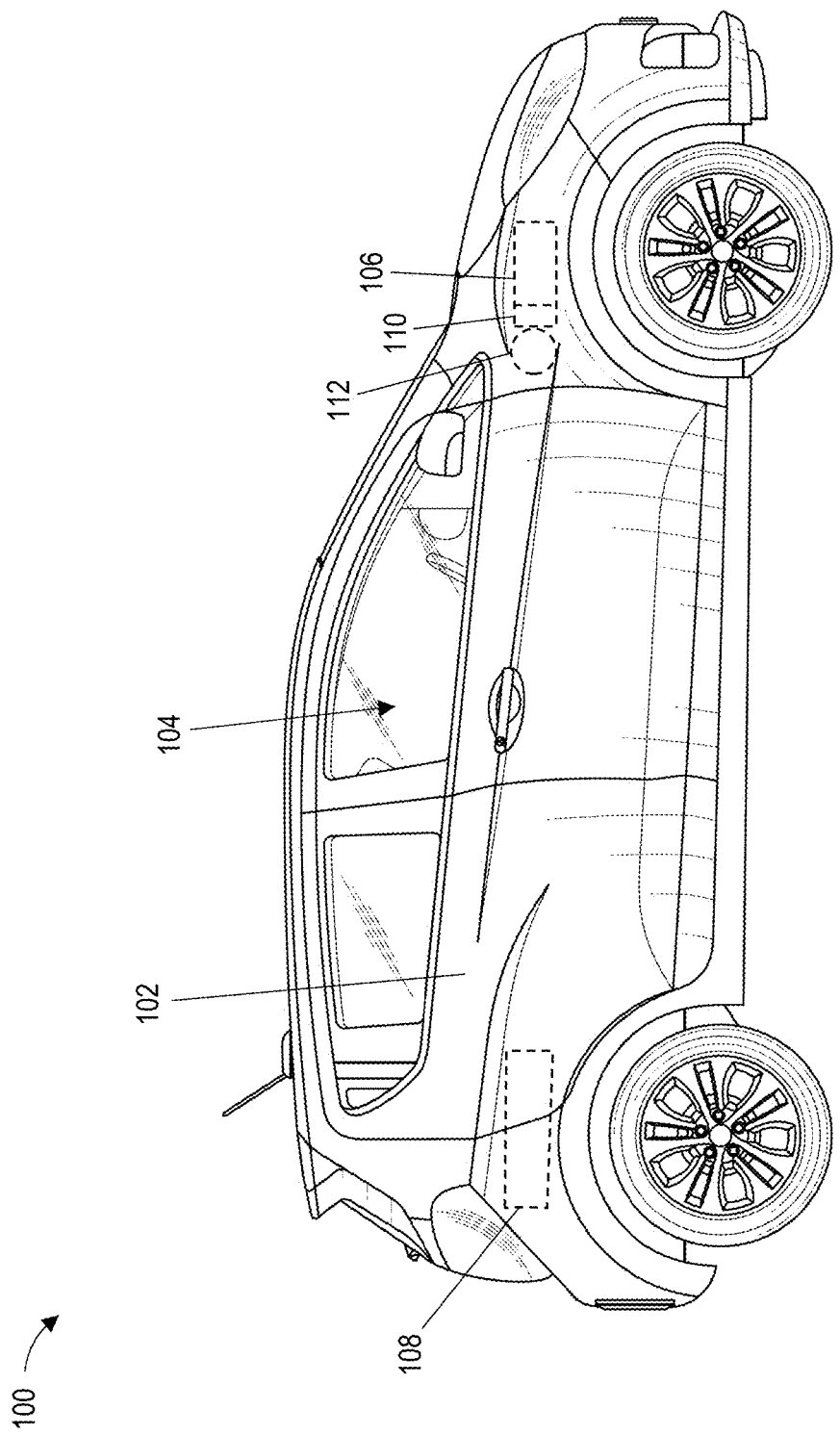
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood), a battery pack 108 (shown by projection near the rear of the vehicle 100), and an inverter and/or converter (here, inverter 110, shown by projection under the front hood). The electric motor 106, battery pack 108, and inverter 110 are shown for ease of illustration and discussion only. It should be understood that the configuration, location, size, arrangement, etc., of the electric motor 106, battery pack 108, and/or inverter 110 is not meant to be particularly limited, and all such configurations (including multi-motor and/or multi-pack configurations) are within the contemplated scope of this disclosure.

As will be detailed herein, the vehicle 100 can include a capacitor 112 electrically coupled to a component(s) of the vehicle 100 (e.g., the electric motor 106, battery pack 108, inverter 110, a converter, etc.). In some embodiments, the capacitor 112 is a low parasitic equivalent series L-inductance (ESL) symmetric direct current (DC) link capacitor. The capacitor 112 is shown for ease of illustration and discussion only. It should be understood that the configuration, location, size, number, arrangement, etc., of capacitors 112 is not meant to be particularly limited, and all such configurations are within the contemplated scope of this disclosure. Moreover, while the present disclosure is discussed primarily in the context of lowering total loop inductance in a converter/inverter of an electric vehicle (e.g., the vehicle 100), all aspects of the capacitor 112 described herein can be similarly incorporated within any electrical system (vehicle, building, or otherwise), for example, an electrical circuit having a converter and/or inverter, and all such configurations and applications are within the contemplated scope of this disclosure. The following sections describe the capacitor 112 in the context of the vehicle 100 for ease of illustration and discussion only.

As described previously, capacitors play a role in the switching mechanism of converters and inverters by helping to maintain a constant voltage level during the period of voltage instability following a switch between voltage levels. Unfortunately, high loop inductance (e.g., high ESL) can lead to problems with the converter and inverter switching process. Loop inductance refers to the inductance of a circuit formed by the capacitors, inductors, and other components in a power electronics system. When current flows through a circuit, a magnetic field is created around the conductors, which in turn induces a voltage that opposes the change in current. This phenomenon is known as inductance, and can cause voltage spikes and/or other disruptions in the power signal. For example, when the switching frequency is high, the inductance of the loop can cause a delay in the current response, leading to voltage spikes that can reduce efficiency, increase heat dissipation, and potentially result in damage to a power electronic component(s). For wide bandgap (WBG) devices, a higher total loop inductance can result in a higher drain voltage spike overshoot when switching and to lower damping factors, resulting in a larger voltage ringing after switching.

This disclosure introduces a new film capacitor architecture that leverages a symmetrically coupled layout design to enable magnetic field cancellation, achieving very low parasitic ESL (e.g., lower total loop inductance). In some embodiments, a capacitor includes a plurality of vertically stacked, alternating positive and negative film layers. In some embodiments, the positive film layers are electrically coupled to a first contact layer which is attached to a positive terminal and the negative film layers are electrically coupled to a second contact layer which is attached to a negative terminal. In some embodiments, the positive terminal and the negative terminal are positioned vertically and in parallel on the same side of the capacitor. In some embodiments, each of the positive film layers includes a first protruding portion making contact to the first contact layer and each of the negative film layers includes a second protruding portion making contact to the second contact layer. The capacitor is structured such that the first protruding portion and the second protruding portion do not overlap. In other words, any vertical plane that intersects two of the first protruding portions of the positive film layers will not intersect any of the second protruding portions of the negative film layers, and vice versa.

Capacitors constructed with symmetrically coupled layouts in accordance with one or more embodiments offer several technical advantages over other capacitor architecture. In short, the capacitors described herein natively offer magnetic field cancellation over the entire current path of the capacitor due to the symmetrically reversed electrical polarity of the parallel negative and positive terminals. Other technical advantages include a suppressed switching voltage spike, high frequency (greater than about 40 Mhz) ringing attenuation (observe that a lowered loop inductance increases the damping factor in an RLC series loop), and improved (lower) converter/inverter switching losses (improved by relatively faster switching enabled by relatively lower loop inductance).

Capacitors having symmetrically coupled layout designs as described herein are highly scalable—multiple capacitors can themselves be coupled symmetrically using common busbars to further maximize magnetic field cancellation, achieving a relatively lower ESL than is possible using alternative capacitor designs that do not offer full path magnetic field cancellation. Further scaling can be achieved by merging multilayer busbars (i.e., busbar laminates), allowing for maximum magnetic field cancellation with skin effect without increasing current density.

Moreover, capacitor designs described herein can be flexibly applied to a range of applications. For example, multiple capacitor film layers can be terminated into a single set of positive and negative sandwiched busbars for a single monolithic capacitor, or alternatively, into multiple terminal sets with a laminated busbar integration for a variable and/or distributed capacitance. Multi-layer laminated busbars can be used to scale/integrate arbitrarily sized multiple capacitor sets. In some embodiments, output terminals are placed on all four sides around the capacitor cells to achieve further reductions in ESL and equivalent series resistance (ESR) due to a reduction in parasitic effects. In some embodiments, busbars are placed on two sides of the capacitor in a dual-inverter and/or double power module inverter configuration (e.g., multilevel inverters) to reduce size and cost and to increase power density.

FIG. 2A illustrates a view of a capacitor 112 in accordance with one or more embodiments. In some embodiments, the capacitor 112 is a multilayer film (and/or multilayer plate) type capacitor. In some embodiments, the capacitor 112 includes a capacitor module 200 having one or more positive-dielectric-negative (PDN) stacks 202. In some embodiments, each of the PDN stacks 202 includes a positive layer 204, a negative layer 206, and a dielectric layer 208 between the positive layer 204 and the negative layer 206. In some embodiments, each of the PDN stacks 202 includes a bottom dielectric layer 210 (and/or a top dielectric layer, not separately shown) to provide electrical isolation to any additional PDN stacks 202 below (or above) in the capacitor module 200.

FIG. 2B illustrates a view of a single PDN stack 202 of the capacitor 112 of FIG. 2A in accordance with one or more embodiments. In some embodiments, a single PDN stack 202 can include a positive layer 204, a negative layer 206, a dielectric layer 208, and a bottom dielectric layer 210. The specific configuration of the capacitor 112 depicted in FIG. 2A is shown for ease of illustration and discussion only. It should be understood that the configuration of the capacitor 112 (e.g., the number of PDN stacks 202, the width, length, and height of each respective layer, etc.) is not meant to be particularly limited and all such configurations are within the contemplated scope of this disclosure.

In some embodiments, the positive layer 204 and the negative layer 206 are conductive films (also referred to as plates). The positive layer 204 and the negative layer 206 can be single-sided metalized or double-sided metalized, as desired. For example, in some embodiments, such as when the capacitor 112 is configured as an in-series capacitor, the positive layer 204 and the negative layer 206 are partially metalized (e.g., one side) to increase the voltage rating.

In some embodiments, the positive layer 204 and the negative layer 206 are conductive metals, although other conductive materials are possible. The choice of materials for the positive layer 204 and the negative layer 206 depends on the particular requirements and operating conditions of a given application. For example, the positive layer 204 and the negative layer 206 can be made of a metal (e.g., aluminum, zinc, copper, silver, gold, tantalum, stainless steel, etc.), metal alloy (e.g., silver-palladium alloys, aluminum-zinc alloys, etc.), conductive nonmetals (e.g., graphite), and/or a combination thereof. In some embodiments, the positive layer 204 and the negative layer 206 are made of a same conductive material. In some embodiments, the positive layer 204 and the negative layer 206 are made of different conductive materials.

The dielectric layer 208 and the bottom dielectric layer 210 can be made of any suitable dielectric material, such as, for example, polypropylene, polyester, polycarbonate, polystyrene, polyphenylene sulfide, paper, ceramics, and/or a combination thereof. In some embodiments, the dielectric layer 208 and the bottom dielectric layer 210 are made of a same dielectric material. In some embodiments, the dielectric layer 208 and the bottom dielectric layer 210 are made of different dielectric materials.

In some embodiments, the capacitor 112 includes a first contact layer 212 and a second contact layer 214. The first contact layer 212 and the second contact layer 214 can be made of a conductive material, such as, for example, a metal, a metal alloy, conductive nonmetal, and/or a combination thereof. In some embodiments, the first contact layer 212 and the second contact layer 214 are arranged on an end (e.g., a sidewall) of the PDN stack 202. The first contact layer 212 and the second contact layer 214 can be arranged on a same sidewall of the PDN stack 202.

In some embodiments, the positive layer 204 in each of the PDN stacks 202 is electrically coupled to the first contact layer 212. In some embodiments, the positive layer 204 in each of the PDN stacks 202 is directly coupled to the first contact layer 212. Conversely, in some embodiments, the negative layer 206 in each of the PDN stacks 202 is electrically coupled to the second contact layer 214. In some embodiments, the negative layer 206 in each of the PDN stacks 202 is directly coupled to the second contact layer 214.

In some embodiments, the first contact layer 212 is electrically coupled to a positive terminal 216 (also referred to as a positive busbar and/or a positive busbar terminal) and the second contact layer 214 is electrically coupled to a negative terminal 218 (also referred to as a negative busbar and/or a negative busbar terminal). In some embodiments, the positive terminal 216 and the negative terminal 218 are collectively referred to as the busbar. In some embodiments, the positive terminal 216 and the negative terminal 218 are positioned vertically and in parallel on a same side of the PDN stacks 202 as the first contact layer 212 and the second contact layer 214, respectively. The positive terminal 216 and the negative terminal 218 can be made of a conductive material, such as, for example, a metal, a metal alloy, a conductive nonmetal, and/or a combination thereof. In some embodiments, one (same) end of the positive terminal 216 and the negative terminal 218 is electrically coupled to a source (e.g., a battery, not separately shown) and an opposite (same) end of the positive terminal 216 and the negative terminal 218 is electrically coupled to a drain (e.g., a power module, not separately shown).

As shown in FIG. 2B, the positive layer 204 includes a first protruding portion 220 and the negative layer 206 includes a second protruding portion 222. In some embodiments, the first protruding portion 220 of the positive layer 204 provides contact to the first contact layer 212. In some embodiments, the second protruding portion 222 of the negative layer 206 provides contact to the second contact layer 214. In some embodiments, the first protruding portion 220 and the second protruding portion 222 are offset with respect to one another when viewed from above (or below). In other words, in some embodiments, the capacitor 112 is structured such that the first protruding portion 220 and the second protruding portion 222 do not overlap.

In some embodiments, additional positive terminals 216 and negative terminals 218 can be placed on remaining ends of the capacitor 112 to further lower ESL and ESR. For example, four positive terminals 216 and four negative terminals 218 can be placed on all ends of the capacitor 112 (not separately shown).

FIG. 2C depicts a top-down view of the single PDN stack 202 of FIG. 2B to illustrate the offset between the first protruding portion 220 and the second protruding portion 222. As shown in FIG. 2C, in some embodiments, the positive layer 204 and/or the negative layer 206 can be patterned with one or more self-healing features 224.

A self-healing feature in a capacitor enables a capacitor to repair and/or restructure itself in the event of a breakdown or electrical discharge. In particular, a localized breakdown in the dielectric material of a capacitor can result in an unintended conductive path (i.e., a localized short) between the capacitor plates. During a short, stored electrons in the capacitor 112 and any associated circuitry (not separately shown) can cross between the plates at the shorted point. The electron density concentration can result in a high localized current condition, which in turn can provide sufficient energy (heat) to vaporize the relatively thin metallic electrode (plate) at the location of the short. As a result of this vaporization, the unintended conductive path is destroyed and the short condition ends. This is known as "clearing" and defines the self-healing process.

In some embodiments, the self-healing features 224 are structured to fuse and/or otherwise fail (intentionally) to close off an unintended conductive path in, across, or between the positive layer 204 and/or the negative layer 206. For example, the self-healing features 224 can be spaced such that a portion of the positive layer 204 (or the negative layer 206) between two adjacent self-healing features 224 can vaporize and/or melt when subjected to a high current (e.g., above design limits), allowing the adjacent self-healing features 224 to fuse and clear the unintended conductive path. In this manner the self-healing process can prevent the capacitor 112 from failing and can help to extend its lifespan. The shape, number, and arrangement of the self-healing features 224 are not meant to be particularly limited and can vary depending on the needs of a particular application. The specific configuration of self-healing features 224 shown in FIG. 2C is generally illustrative of the concept of self-healing features. In some embodiments, the self-healing features 224 are stamped, patterned, molded, etched, and/or otherwise cut into the positive layer 204 and/or the negative layer 206.

Figure 3:
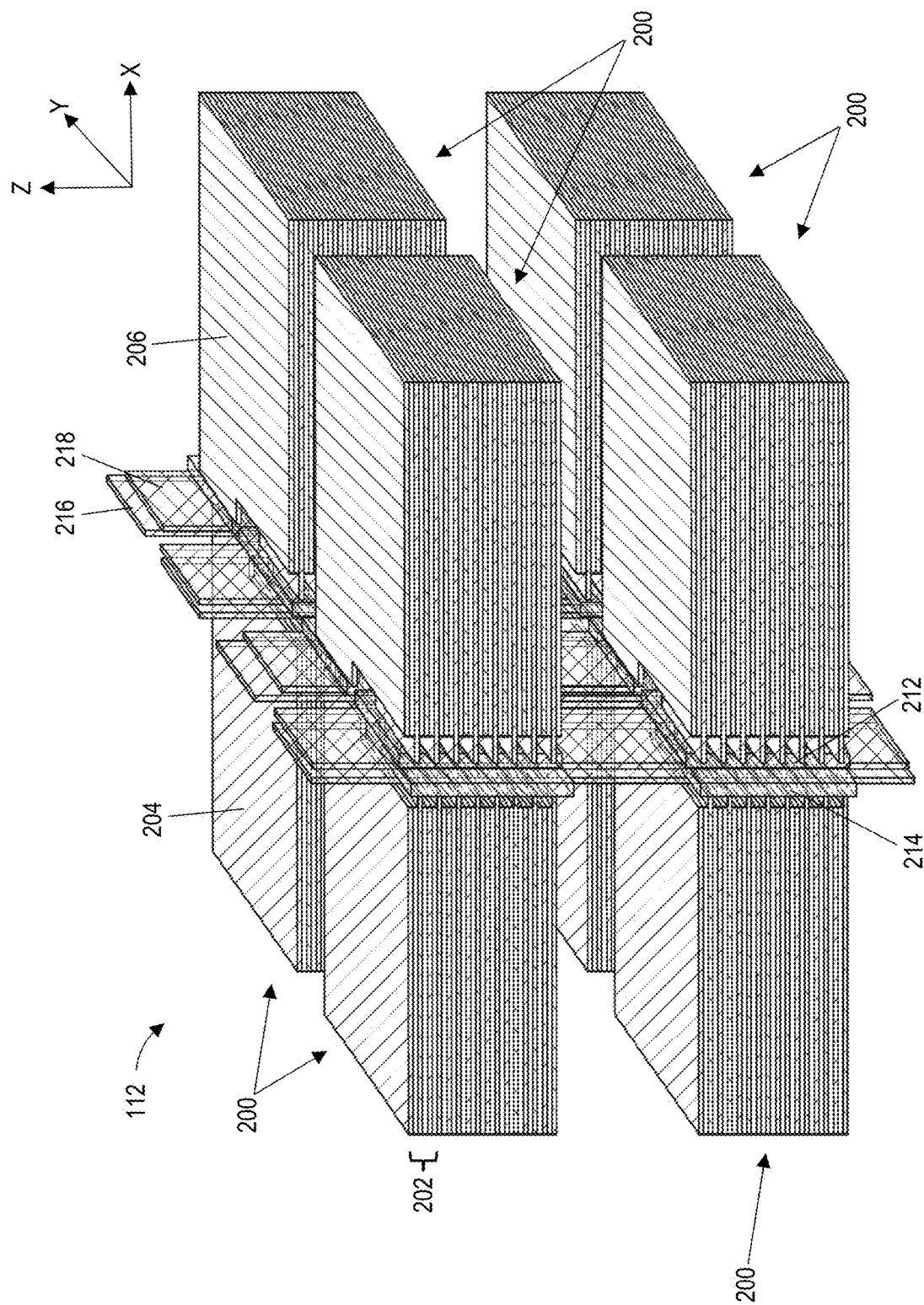
FIG. 3 is a view of an alternative embodiment of a capacitor in accordance with one or more embodiments.

FIG. 3 illustrates a view of an alternative embodiment of the capacitor 112 in accordance with one or more embodiments. The capacitor 112 can be constructed in a similar manner as discussed previously with respect to FIG. 2A, except that the capacitor 112 in FIG. 3 has been extended to include additional capacitor modules 200. The capacitor 112 can be expanded horizontally and/or vertically as desired. The specific configuration of the capacitor 112 depicted in FIG. 3 (here, a 2×2×2 arrangement of capacitor modules 200) is shown for ease of illustration and discussion only. It should be understood that the general configuration of the capacitor 112 (e.g., the number and arrangement of capacitor modules 200, the number of PDN stacks 202 in each of the capacitor modules 200, the width, length, and height of each respective layer, etc.) is not meant to be particularly limited and all such configurations are within the contemplated scope of this disclosure.

In some embodiments, the capacitor modules 200 are arranged such that capacitor modules 200 in a first direction "Y" (e.g., on a same side of the positive terminals 216 and the negative terminals 218) have a mirrored configuration. As used herein, a "mirrored" configuration is denoted by (1) a same relative arrangement of the first contact layer 212, the second contact layer 214, the positive terminals 216, and the negative terminals 218; and (2) a same PDN stack configuration (e.g., a same topmost layer in the respective PDN stacks 202). For example, the topmost layer in the respective PDN stacks 202 of two mirrored capacitor modules 200 will both be the positive layer 204 (or alternatively, the negative layer 206).

In some embodiments, the capacitor modules 200 are arranged such that capacitor modules 200 in a second direction "X" (e.g., on opposite sides of the positive terminals 216 and the negative terminals 218) have a flipped configuration. As used herein, a "flipped" configuration is denoted by (1) a reversed arrangement of the first contact layer 212, the second contact layer 214, the positive terminals 216, and the negative terminals 218 (e.g., the relative positions are swapped); and (2) a reversed PDN stack configuration (e.g., a different topmost layer in the respective PDN stacks 202). For example, a topmost layer one of the respective PDN stacks 202 will be the positive layer 204 and the other topmost layer will be the negative layer 206.

In some embodiments, the capacitor modules 200 are arranged such that capacitor modules 200 in a third direction "Z" (e.g., vertically stacked above and/or below one or more other capacitor modules 200) have a mirrored configuration. In some embodiments, the respective positive terminals 216 and negative terminals 218 extend to vertically integrate two vertically stacked capacitor modules 200 (as shown).

Arranging the capacitor modules 200 with mirrored and flipped configurations in this manner allows for a maximum degree of magnetic field cancellation on the busbar (i.e., between the positive terminal 216 and the negative terminal 218)-in short, this arrangement ensures that the capacitor terminals (e.g., the positive terminal 216 and the negative terminal 218) have a symmetrically reversed electrical polarity in parallel. Notably, maximizing the degree of magnetic field cancellation on the busbar will result in a reduction in ESL. In some embodiments, further reductions in the magnetic field are realized by insulating the busbar with a high-k dielectric (not separately shown). As used herein, a "high-k" dielectric is a dielectric material having a dielectric constant greater than 3.9 (i.e., greater than the dielectric constant of silicon dioxide). Insulating the busbar by separating the positive terminal 216 and the negative terminal 218 with a high-k dielectric in this manner allows for a relatively (with respect to lower-k dielectrics) smaller gap between the positive terminal 216 and the negative terminal 218. In some embodiments, a region around the busbar is filled with additional dielectric material, such as a polymer and/or resin, to improve creepage (e.g., current flowing along the busbar) and clearance (e.g., the effective distance between the positive terminal 216 and the negative terminal 218).

FIG. 4A illustrates a view of another alternative embodiment of the capacitor 112 in accordance with one or more embodiments. The capacitor 112 can be constructed in a similar manner as discussed previously with respect to FIG. 2A. except that the positive terminal 216 and the negative terminal 218 of the capacitor 112 in FIG. 4A are each split, respectively, to opposite ends of the capacitor module 200. Advantageously, splitting the positive terminal 216 and the negative terminal 218 in this manner can improve thermal effects as heat can be more evenly spread across the surfaces of the positive layers 204 and the negative layers 206.

FIG. 4B illustrates a view of yet another alternative embodiment of the capacitor 112 in accordance with one or more embodiments. The capacitor 112 can be constructed in a similar manner as discussed previously with respect to FIG. 2A. except that the capacitor 112 in FIG. 4B includes a dual-sided configuration. In some embodiments, a pair of positive terminals 216 and a pair of negative terminals 218 are placed on opposite ends of the capacitor module 200. Advantageously, a dual-sided configuration affords flexibility in connectivity to upstream/downstream components. For example, a source, such as a battery, can be connected to either end of the capacitor 112 while a drain, such as a power module, can be connected to the same end, or to a different end, of the capacitor 112 (source and drain components are not separately shown).

Figure 5:
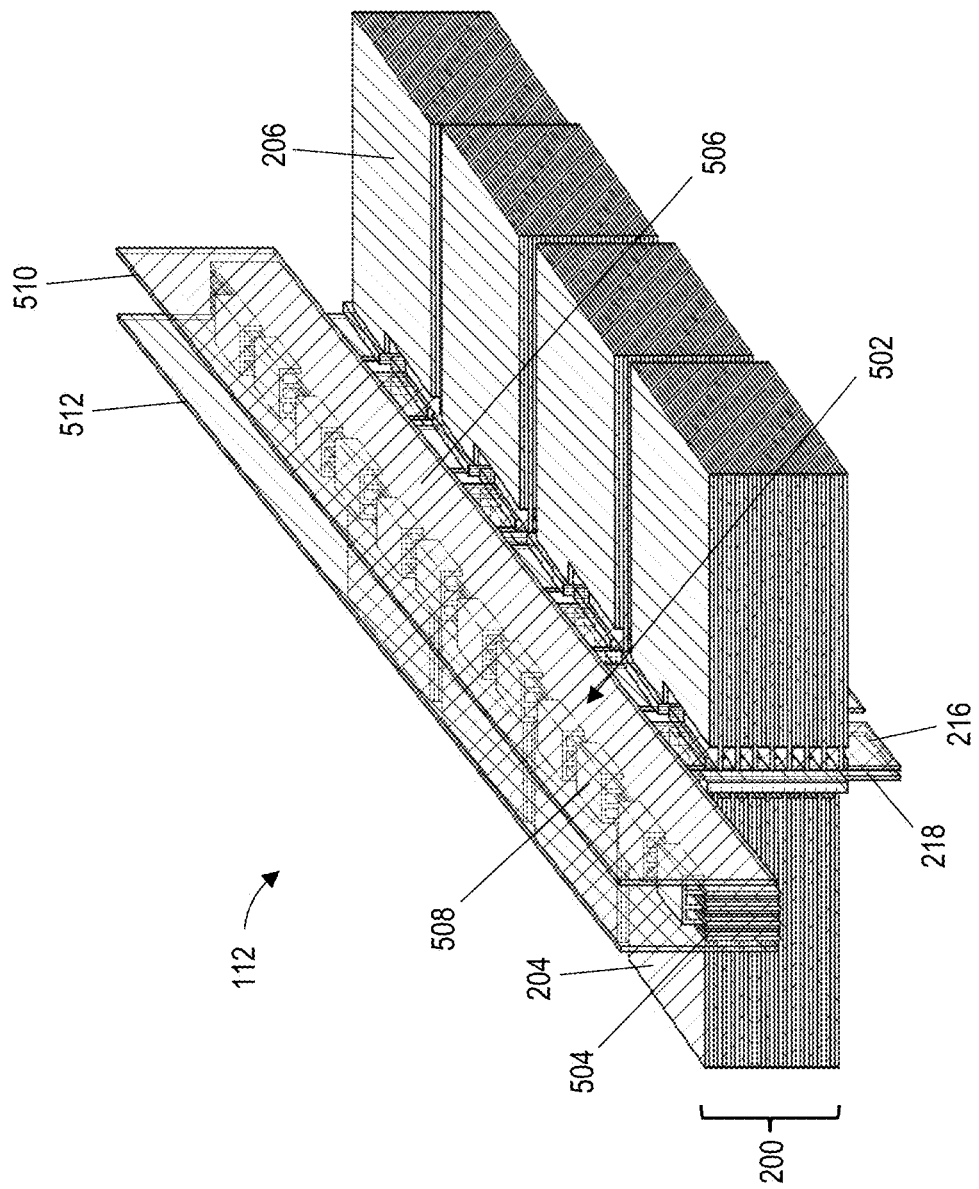
FIG. 5 is a view of an embodiment of a capacitor having a multi-layer laminated busbar configuration in accordance with one or more embodiments.

FIG. 5 illustrates a view of an alternative embodiment of the capacitor 112 in accordance with one or more embodiments. The capacitor 112 can be constructed in a similar manner as discussed previously with respect to FIG. 2A, except that the capacitor 112 in FIG. 5 includes a multi-layer laminated busbar configuration. In some embodiments, each of the positive terminals 216 and each of the negative terminals 218 can be coupled to a laminated busbar 502.

In some embodiments, the laminated busbar 502 includes one or more positive layers 504 alternating with one or more negative layers 506. In some embodiments, the laminated busbar 502 includes a same number of bus bar layers (i.e., a total number of positive layers 504 and negative layers 506) as a total number of positive terminals 216 and negative terminals 218 in the capacitor 112. In some embodiments, each capacitor bus bar terminal (i.e., each of the positive layers 504 and the negative layers 506) is coupled to a respective one of the positive terminals 216 and the negative terminals 218 of matching polarity. Advantageously, connecting the positive layers 504 and the negative layers 506 to each of the positive layers 504 and the negative layers 506, respectively, enables a relatively lower current density.

The laminated busbar 502 can be made of similar materials as the positive terminals 216 and the negative terminals 218. In some embodiments, each adjacent pair of positive layers 504 and negative layers 506 is separated via a dielectric layer (refer FIG. 2A). In some embodiments, the dielectric layer is a high-k dielectric layer.

In some embodiments, the laminated busbar 502 includes one or more vias 508. In some embodiments, all of the positive layers 504 are electrically coupled through a first subset of the one or more vias 508. In some embodiments, all of the negative layers 506 are electrically coupled through a second subset of the one or more vias 508. In some embodiments, the laminated busbar 502 includes a primary positive busbar 510 and a primary negative busbar 512. In some embodiments, the primary positive busbar 510 is electrically coupled to all of the positive layers 504 and the negative busbar 512 is electrically coupled to all of the negative layers 506.

Advantageously, a multi-layer laminated busbar configured in this manner enables current merging, maximizing magnetic field cancellation via skin effect without increasing current density. As a result, a multi-layer laminated busbar configured in this manner can provide a lower ESL than is achievable using non-laminated busbar configurations. In some embodiments, the laminated busbar 502 is enclosed in an insulator (not separately shown) to improve creepage and clearance, as described previously herein.

Figure 6:
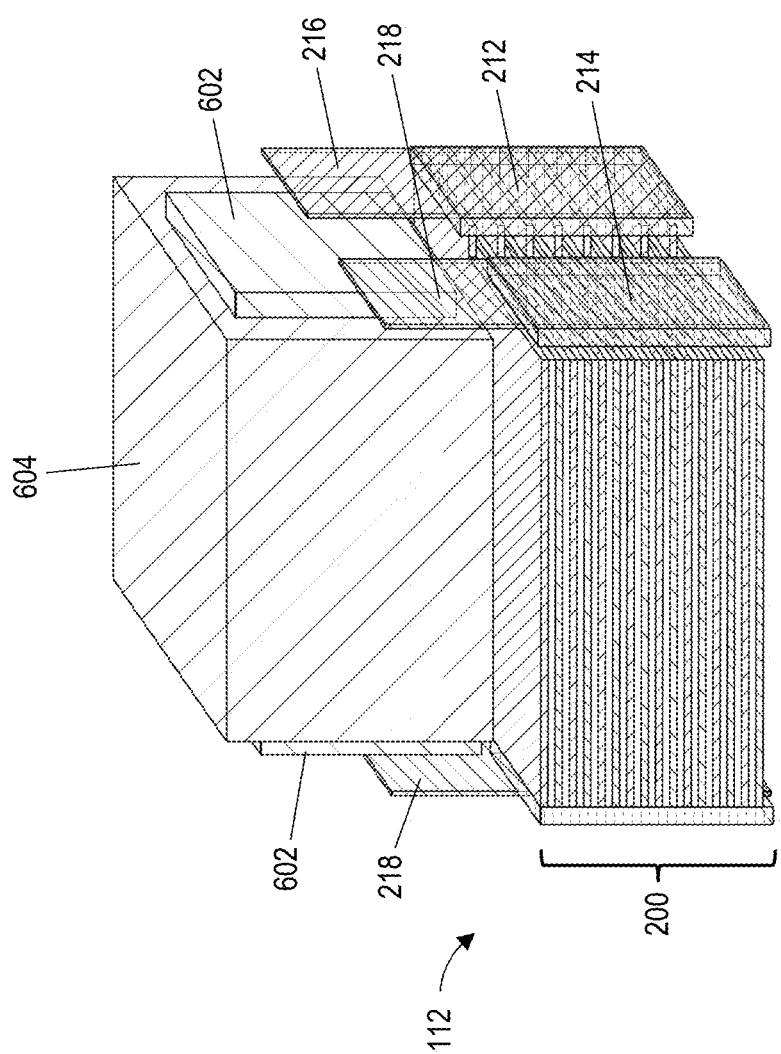
FIG. 6 is a view of an alternative embodiment of a capacitor in accordance with one or more embodiments.

FIG. 6 illustrates a view of an alternative embodiment of the capacitor 112 in accordance with one or more embodiments. The capacitor 112 can be constructed in a similar manner as discussed previously with respect to FIG. 2A, except that the capacitor 112 in FIG. 6 includes a dual-sided configuration. In some embodiments, a pair of positive terminals 216 and a pair of negative terminals 218 are placed on opposite ends of the capacitor module 200. Advantageously, positioning the pair of positive terminals 216 and the pair of negative terminals 218 on opposite ends of the capacitor module 200 in this manner enables additional configuration options, such as the use of dual-inverters (e.g., IGBT, SiC, etc., not separately shown) and/or double power module inverters having separate power modules 602 coupled to each end of the dual-sided capacitor 112 (as shown). In some embodiments, a cooling jacket 604 is coupled to the power module(s) 602. Additional benefits of the configuration shown in FIG. 6 include a reduced packaging size (e.g., two inverters can share one capacitor), a larger switch count (e.g., multilevel inverters), and an increase in power density (e.g., dual-sided power delivery).

Figure 7:
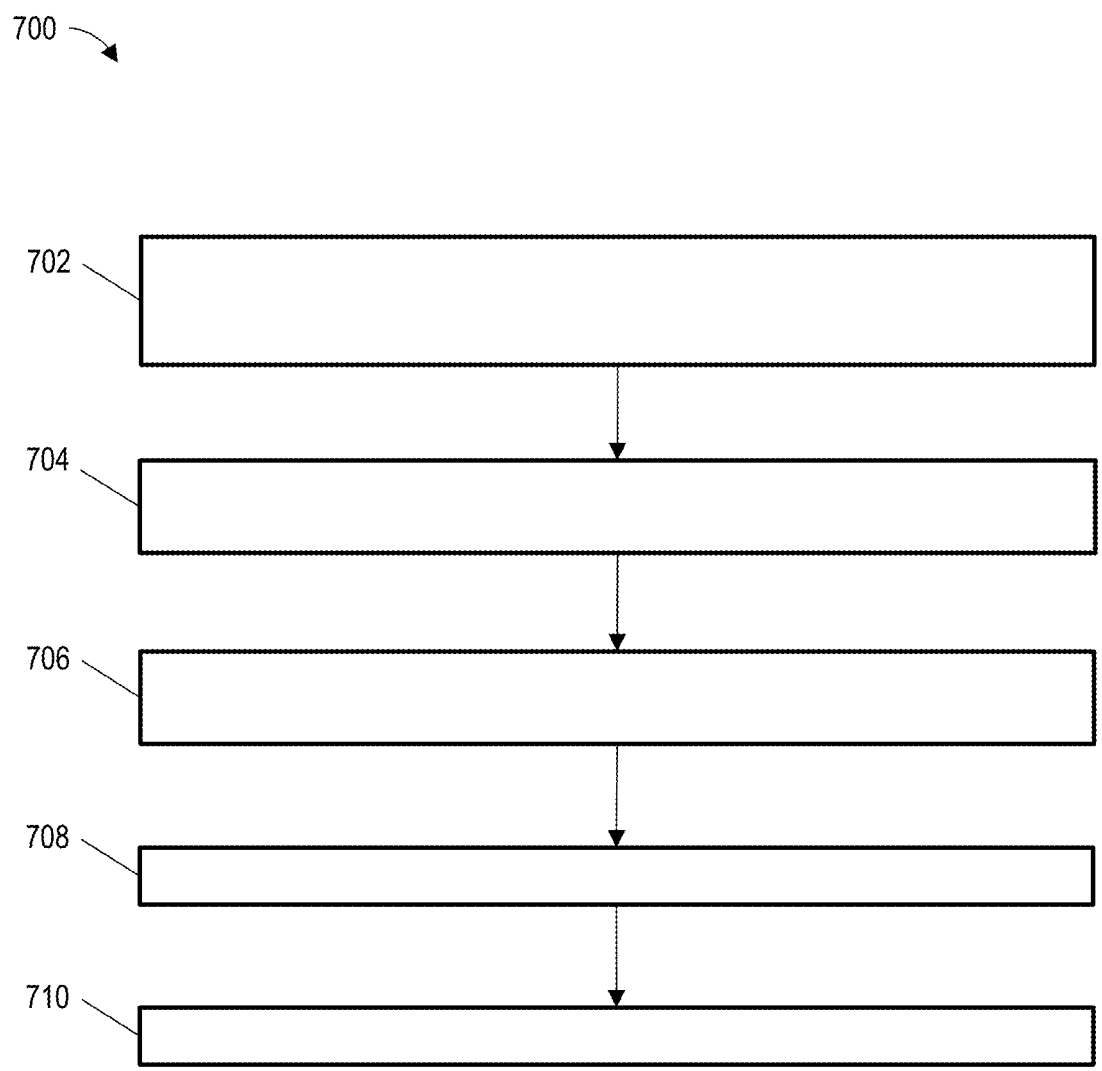
FIG. 7 is a flowchart in accordance with one or more embodiments.

Referring now to FIG. 7, a flowchart 700 for leveraging a symmetrically coupled film capacitor architecture for low parasitic ESL is generally shown according to an embodiment. The flowchart 700 is described in reference to FIGS. 1 to 6 and may include additional steps not depicted in FIG. 7. Although depicted in a particular order, the blocks depicted in FIG. 7 can be rearranged, subdivided, and/or combined.

At block 702, one or more PDN stacks are formed. Each PDN stack includes a positive layer, a negative layer, and a dielectric layer between the positive layer and the negative layer. In some embodiments, each of the PDN stacks includes a bottom dielectric layer positioned such that the negative layer is between the dielectric layer and the bottom dielectric layer. In some embodiments, the positive layer and the negative layer each include one of a single-sided metalized film and a double-sided metalized film.

At block 704, a first contact layer is electrically coupled to the positive layer. The first contact layer is positioned on a sidewall of the one or more PDN stacks.

At block 706, a second contact layer is electrically coupled to the negative layer. The second contact layer is positioned on the sidewall of the one or more PDN stacks.

At block 708, a positive terminal is electrically coupled to the first contact layer. At block 710, a negative terminal is electrically coupled to the second contact layer. In some embodiments, the positive terminal and the negative terminal collectively define a busbar of the capacitor.

In some embodiments, the positive terminal and the negative terminal are positioned vertically and in parallel on a same sidewall of the PDN stacks as the first contact layer and the second contact layer.

In some embodiments, the positive layer includes a first protruding portion providing contact to the first contact layer and the negative layer includes a second protruding portion providing contact to the second contact layer. In some embodiments, the first protruding portion and the second protruding portion are offset with respect to one another such that the first protruding portion and the second protruding portion do not overlap.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
an electric motor;
a battery pack electrically coupled to the electric motor;
a converter configured to convert a direct current at a first voltage from the battery pack to a direct current at a second voltage lower than the first voltage;
an inverter configured to convert the direct current from the battery pack to an alternating current supplied to the electric motor; and
a capacitor electrically coupled to at least one of the inverter and the converter of the vehicle, the capacitor comprising one or more capacitor modules comprising:
a plurality of vertically stacked positive-dielectric-negative (PDN) stacks, each PDN stack comprising a positive layer, a negative layer, and a dielectric layer between the positive layer and the negative layer, wherein the positive layer comprises a first protruding portion and the negative layer comprises a second protruding portion, each of the PDN stacks configured such that all first protruding portions and all second protruding portions extend from a same side of the capacitor;
a first contact layer electrically coupled to the first protruding portion of all of the positive layers, the first contact layer on a sidewall of the PDN stacks;
a second contact layer electrically coupled to the second protruding portion of all of the negative layers, the second contact layer on the sidewall of the PDN stacks;
a positive terminal electrically coupled to the first contact layer; and
a negative terminal electrically coupled to the second contact layer.

2. The vehicle of claim 1, wherein each of the PDN stacks comprises a bottom dielectric layer, wherein the negative layer is between the dielectric layer and the bottom dielectric layer.

3. The vehicle of claim 1, wherein the positive layer and the negative layer each comprise one of a single-sided metalized film and a double-sided metalized film.

4. The vehicle of claim 1, wherein the positive terminal and the negative terminal collectively define a busbar of the capacitor.

5. The vehicle of claim 4, wherein the positive terminal and the negative terminal are positioned vertically and in parallel on a same sidewall of the PDN stacks as the first contact layer and the second contact layer.

6. The vehicle of claim 1, wherein the first protruding portion and the second protruding portion are offset with respect to one another such that the first protruding portion and the second protruding portion do not overlap.

7. A capacitor comprising:
a plurality of vertically stacked positive-dielectric-negative (PDN) stacks, each PDN stack comprising a positive layer, a negative layer, and a dielectric layer between the positive layer and the negative layer, wherein the positive layer comprises a first protruding portion and the negative layer comprises a second protruding portion, each of the PDN stacks configured such that all first protruding portions and all second protruding portions extend from a same side of the capacitor;
a first contact layer electrically coupled to the first protruding portion of all of the positive layers, the first contact layer on a sidewall of the one or more PDN stacks;
a second contact layer electrically coupled to the second protruding portion of all of the negative layers, the second contact layer on the sidewall of the one or more PDN stacks;
a positive terminal electrically coupled to the first contact layer; and
a negative terminal electrically coupled to the second contact layer.

8. The capacitor of claim 7, wherein each of the PDN stacks comprises a bottom dielectric layer, wherein the negative layer is between the dielectric layer and the bottom dielectric layer.

9. The capacitor of claim 7, wherein the positive layer and the negative layer each comprise one of a single-sided metalized film and a double-sided metalized film.

10. The capacitor of claim 7, wherein the positive terminal and the negative terminal collectively define a busbar of the capacitor.

11. The capacitor of claim 10, wherein the positive terminal and the negative terminal are positioned vertically and in parallel on a same sidewall of the PDN stacks as the first contact layer and the second contact layer.

12. The capacitor of claim 7, wherein the first protruding portion and the second protruding portion are offset with respect to one another such that the first protruding portion and the second protruding portion do not overlap.

13. A method for reducing a parasitic equivalent series L-inductance (ESL) of a capacitor, the method comprising:
forming a plurality of vertically stacked positive-dielectric-negative (PDN) stacks, each PDN stack comprising a positive layer, a negative layer, and a dielectric layer between the positive layer and the negative layer, wherein the positive layer comprises a first protruding portion and the negative layer comprises a second protruding portion, each of the PDN stacks configured such that all first protruding portions and all second protruding portions extend from a same side of the capacitor;
electrically coupling a first contact layer to the first protruding portion of all of the positive layers, the first contact layer on a sidewall of the PDN stacks;
electrically coupling a second contact layer to the second protruding portion of all of the negative layers, the second contact layer on the sidewall of the PDN stacks;
electrically coupling a positive terminal to the first contact layer; and
electrically coupling a negative terminal to the second contact layer.

14. The method of claim 13, wherein each of the PDN stacks comprises a bottom dielectric layer, wherein the negative layer is between the dielectric layer and the bottom dielectric layer.

15. The method of claim 13, wherein the positive layer and the negative layer each comprise one of a single-sided metalized film and a double-sided metalized film.

16. The method of claim 13, wherein the positive terminal and the negative terminal collectively define a busbar of the capacitor.

17. The method of claim 16, wherein the positive terminal and the negative terminal are positioned vertically and in parallel on a same sidewall of the PDN stacks as the first contact layer and the second contact layer.

18. The method of claim 13, wherein the positive layer comprises a first protruding portion providing contact to the first contact layer and the negative layer comprises a second protruding portion providing contact to the second contact layer.

19. The vehicle of claim 1, further comprising a laminated busbar having one or more positive layers alternating with one or more negative layers, wherein each of the one or more positive layers and each of the one or more negative layers of the laminated busbar is coupled to a respective one of the positive terminal or the negative terminal of the capacitor.

20. The capacitor of claim 7, further comprising a laminated busbar having one or more positive layers alternating with one or more negative layers, wherein each of the one or more positive layers and each of the one or more negative layers of the laminated busbar is coupled to a respective one of the positive terminal or the negative terminal of the capacitor.

* * * * *